United States Patent
Brailean et al.

[11] Patent Number: 6,002,715
[45] Date of Patent: Dec. 14, 1999

[54] METHOD FOR A RECEIVER UNIT TO DETERMINE A QUALITY VALUE FOR A RECEIVED SIGNAL

[75] Inventors: Karen A. Brailean, Park Ridge; Mark S. Nowak, Chicago, both of Ill.

[73] Assignee: Motorola, Inc., Schaumburg, Ill.

[21] Appl. No.: 08/866,662

[22] Filed: Jun. 5, 1997

Related U.S. Application Data

[60] Provisional application No. 60/021,580, Jul. 11, 1996.

[51] Int. Cl.[6] .............................. H04B 17/00; H04B 3/46; H04Q 1/20
[52] U.S. Cl. .................. 375/227; 375/346; 455/67.3; 455/63; 455/226.1
[58] Field of Search .................... 375/224, 316, 375/227, 346; 455/67.3, 63, 226.1

[56] References Cited

U.S. PATENT DOCUMENTS

| | | | |
|---|---|---|---|
| 5,440,590 | 8/1995 | Birchler et al. | 375/347 |
| 5,726,978 | 3/1998 | Frodigh et al. | 370/252 |
| 5,812,600 | 9/1998 | Hess et al. | 375/261 |
| 5,898,730 | 4/1999 | Hensley et al. | 375/224 |

*Primary Examiner*—Don N. Vo
*Assistant Examiner*—Phuong Phu
*Attorney, Agent, or Firm*—Wayne J. Egan

[57] ABSTRACT

A received signal (310) includes information symbols ("D's") including equidistant symbols that are equidistant from the origin of a complex plane. The D's and corresponding interference signals ("I's") are formed (403) and the quantity of equidistant symbols determined (407). A desired signal portion average is based (409) on the received signal. When the quantity of equidistant symbols exceeds a threshold, an undesired signal portion average is based (413) exclusively on the I's corresponding to the equidistant symbols. Otherwise, the undesired signal portion average is based (423) on the I's corresponding to all received D's, including the equidistant symbols. A received signal quality value is then based on a ratio of the desired signal portion average and the undesired signal portion average.

24 Claims, 2 Drawing Sheets

METHOD FOR A RECEIVER UNIT TO DETERMINE A QUALITY VALUE FOR A RECEIVED SIGNAL

REFERENCE TO PRIOR PROVISIONAL APPLICATION

The applicant hereby claims the priority benefit of prior provisional application Ser. No. 60/021,580 filed Jul. 11, 1996, by Karen A. Brailean and Mark S. Nowak, the same inventors as in the present application, and which prior provisional application is hereby incorporated by reference verbatim, with the same effect as though the prior provisional application were fully and completely set forth herein.

INCORPORATION BY REFERENCE OF ANOTHER U.S. PATENT

The applicant hereby incorporates by reference U.S. Pat. No. 5,440,582, Mark A. Birchler et al., "Method and apparatus for determining signal usability", granted Aug. 8, 1995 (hereinafter "Birchler" or "the Birchler patent"), verbatim and with the same effect as though the same patent were fully and completely set forth herein.

FIELD OF THE INVENTION

The invention relates generally to radio frequency (also known as "wireless") communication systems and, in particular, to a method for a receiver unit to determine a quality value for a received signal.

BACKGROUND OF THE INVENTION

Radio frequency communication systems typically include one or more base stations and one or more subscriber units. As is known, each such base station and subscriber unit contains a receiver unit. It is known to arrange such a receiver unit to determine a quality value for the received signal of its current channel, as well as a quality value for the received signal for each of one or more adjacent channels. It is then possible to decide which channel to use based on comparing the quality values for the corresponding received signals. If a channel offering increased received signal quality is found (the "preferred channel"), the subscriber unit then leaves its current channel and moves to the preferred channel, thereby achieving a better received signal. This process is called a "hand-over".

In today's radio frequency systems, there are several ways to determine a quality value for a received signal. For example, a first approach is to determine the bit error rate. A second technique is to determine the total power of the signal, including the signal plus noise and interference.

Still another way to determine a quality value for a received signal is described in the aforementioned Birchler patent. Briefly, Birchler determines a received signal quality value by measuring the ratio of the signal to the sum of noise and interference. This technique allows the receiver unit to distinguish between a good channel with high signal power versus a bad channel with high interference.

A limitation of Birchler, however, is the maximum ratio of signal to noise-plus-interference-power is achieved even when the actual received signal quality is much better. As a result, a receiver unit cannot distinguish between a non-preferred channel offering a mediocre received signal quality and a preferred channel offering a substantially increased received signal quality. Because the receiver unit cannot identify the preferred channel, the receiver unit cannot take advantage of the substantially increased received signal quality offered by the preferred channel.

Another limitation of Birchler is that the received signal quality determination is dependent on the particular data symbols in the received signal. Thus, when certain data symbols are received, the received signal quality determination is lower than when other data symbols are received. This causes a large variance in the determinations and allows the receiver unit to misinterpret received signal quality. As a result, it is possible the subscriber unit will handover to a channel offering a degraded, rather than an improved, received signal quality.

Accordingly, there is a need for an improved method for a receiver unit to determine a quality value for a received signal.

DESCRIPTION OF THE PREFERRED EMBODIMENT

In accordance with the present invention, a method for a receiver unit to determine a quality value for a received signal is provided wherein the quality value for the received signal is determined based on symbols with similar absolute voltage levels.

Briefly, a received signal is of a form Dh+I, where D is an information symbol of a constellation of symbols in a complex plane, the complex plane including an origin, the constellation of symbols including a set of equidistant symbols, each equidistant symbol being equidistant from the origin, and where h is a fading signal and I is an interference signal. The D's and corresponding I's are formed and the quantity of equidistant symbols determined. A desired signal portion average is based on the received signal. When the quantity of equidistant symbols exceeds a threshold, an undesired signal portion average is based exclusively on the I's corresponding to the equidistant symbols. Otherwise, the undesired signal portion average is based on the I's corresponding to all received D's, including the equidistant symbols. The receiver unit then determines a quality value for the received signal based on a ratio of the desired signal portion average and the undesired signal portion average.

Figure 1:
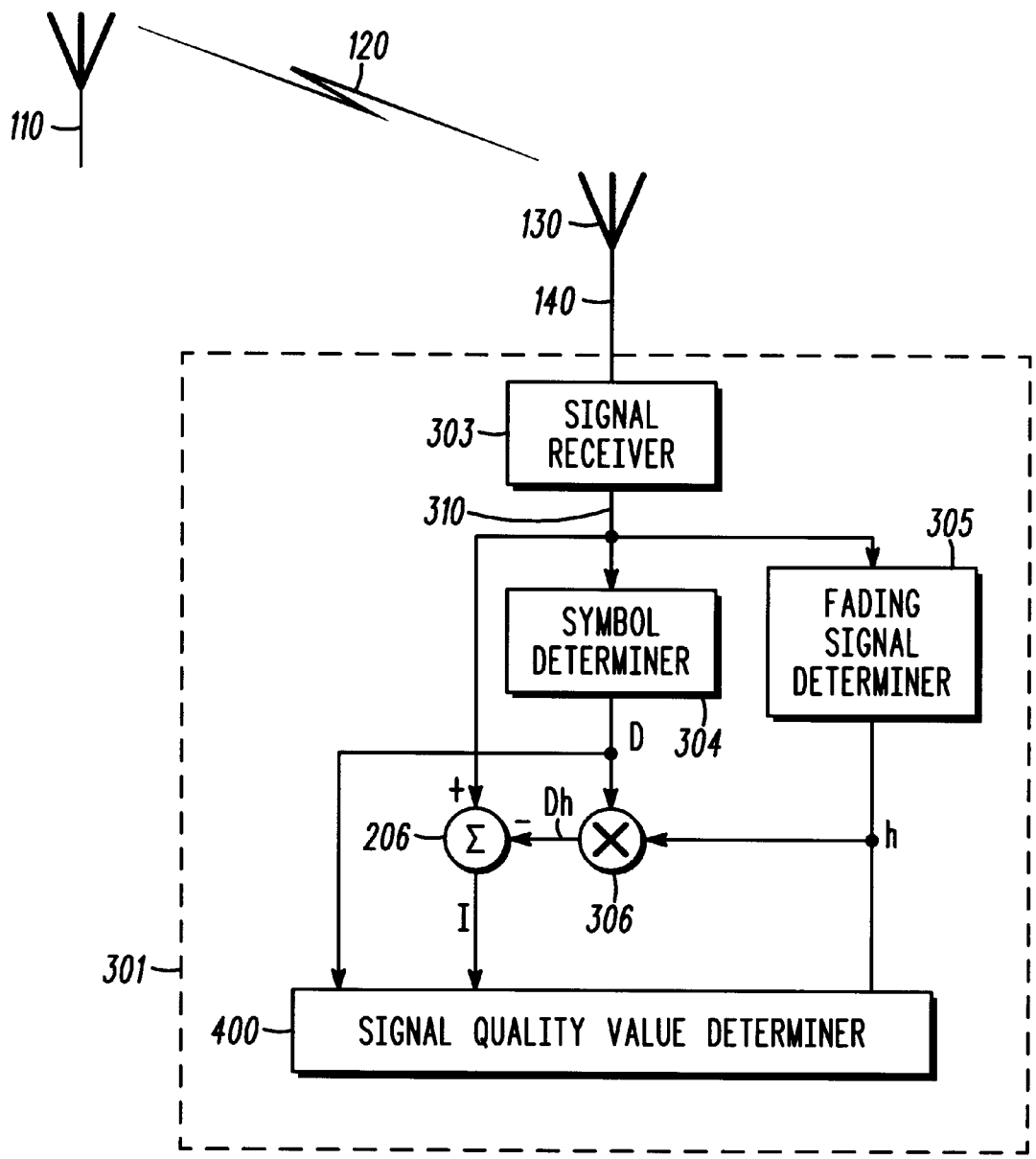
FIG. 1 is a block diagram of a receiver unit that is suitable for demonstrating the present invention.

Referring now to FIG. 1, there is shown a receiver unit 301 that is suitable for demonstrating the present invention. As shown, the receiver unit 301 includes an antenna 130 arranged to receive a radio frequency signal that is propagated by means of a radio frequency channel 120 from a transmitter 110.

In a first embodiment, the receiver unit 301 comprises a subscriber unit, and the transmitter 110 comprises a base station.

In a second embodiment, the receiver unit 301 comprises a base station, and the transmitter 110 comprises a subscriber unit.

The antenna 130 thus forms a signal 140 which, in turn, is input to a signal receiver 303. As a result, the signal receiver 303 forms a received signal 310.

The received signal 310 is of a form Dh+I, where D is an information symbol of a constellation of symbols in a complex plane, the complex plane including an origin, the origin having coordinates 0+j0, the constellation of symbols including a set of equidistant symbols, each equidistant symbol being equidistant from the origin, and where h is a fading signal and I is an interference signal. In the preferred embodiment, the constellation of symbols in a complex plane consists of sixteen symbols with coordinates 1+j, −1+j, −1−j, 1−j, 3+j, 3+j3, 1+j3, −1+j3, −3+j3, −3+j, −3−j, −3−j3, −1−j3, 1−j3, 3−j3, 3−j. The foregoing constellation is a 16-point quadrature amplitude modulation constellation, commonly known as a "16 QAM constellation". In Table 1 below, these sixteen symbols are arranged in three (3) groups such that, within any group, each symbol is equidistant from the origin.

TABLE 1

Symbols of a 16 QAM constellation arranged into 3 groups

| Symbol Group | Symbol Coordinates |
|---|---|
| Core Symbols | 1 + j |
|  | −1 + j |
|  | −1 − j |
|  | 1 − j |
| Corner Symbols | 3 + j3 |
|  | −3 + j3 |
|  | −3 − j3 |
|  | 3 − j3 |
| Edge Symbols | 3 + j |
|  | 1 + j3 |
|  | −1 + j3 |
|  | −3 + j |
|  | −3 − j |
|  | −1 − j3 |
|  | 1 − j3 |
|  | 3 − j |

Referring now to Table 1, a first group of symbols, designated the "Core Symbols", comprises the four symbols nearest to and surrounding the complex origin, the four symbols forming the core of the 16 QAM constellation. Thus, the four Core Symbols have complex coordinates 1+j, −1+j, −1−j and 1−j.

A second group of symbols, designated the "Corner Symbols", comprises the four symbols that form the four corners of the 16 QAM constellation. Thus, the four Corner Symbols have complex coordinates 3+j3, −3+j3, −3−j3 and 3−j3.

A third group of symbols, designated the "Edge Symbols", comprises the eight symbols that form the four edges of the 16 QAM constellation. Thus, the eight Edge Symbols have complex coordinates 3+j, 1+j3, −1+j3, −3+j, −3−j, −1−j3, 1−j3 and 3−j.

In accordance with the present invention, the equidistant symbols comprise a group of symbols whose members are equidistant from the origin. As a result, it is possible for the equidistant symbols to comprise the symbols of any single group of the foregoing three groups of symbols, that is, the Core Symbols, the Corner Symbols or the Edge Symbols. In the preferred embodiment, however, the set of equidistant symbols consists of eight symbols with coordinates 3+j, 1+j3, −1+j3, −3+j, −3−j, −1−j3, 1−j3, 3−j, this set of equidistant symbols being the Edge Symbols described above.

Referring again to FIG. 1, in the radio frequency channel 120, the information symbol stream encounters multiplicative effects of fading and additive effects of interference, including noise, resulting in the received signal 310 being of a form Dh+I, where D is an information symbol of a constellation of symbols in a complex plane, the complex plane including an origin, the constellation of symbols including a set of equidistant symbols, each equidistant symbol being equidistant from the origin, and where h is a fading signal and I is an interference signal.

Referring still to FIG. 1, the receiver unit 301 comprises the signal receiver 303, a symbol determiner 304, a fading signal determiner 305, a desired signal portion determiner 306, an undesired signal portion determiner 206 and a signal quality value determiner 400. Each of the elements 303, 304, 305, 306 and 206 shown in the present FIG. 1 respectively corresponds to the like-numbered elements 303, 304, 305, 306 and 206 of the Birchler patent. In contrast, the signal quality value determiner 400 shown in the present FIG. 1 is unique to the present invention and is described below.

Accordingly, it will be appreciated that the receiver unit 301 is arranged to form the received signal 310 and to determine each information symbol D and the corresponding fading signal h and interference signal I contained in the received signal 310. As shown in FIG. 1, the D, h and I signals ultimately are presented to the signal quality value determiner 400. In turn, the signal quality value determiner 400, acting in concert with the elements 303, 304, 305, 306 and 206, is arranged to determine a quality value for the received signal 310 in accordance with the process depicted in FIG. 2.

Figure 2:
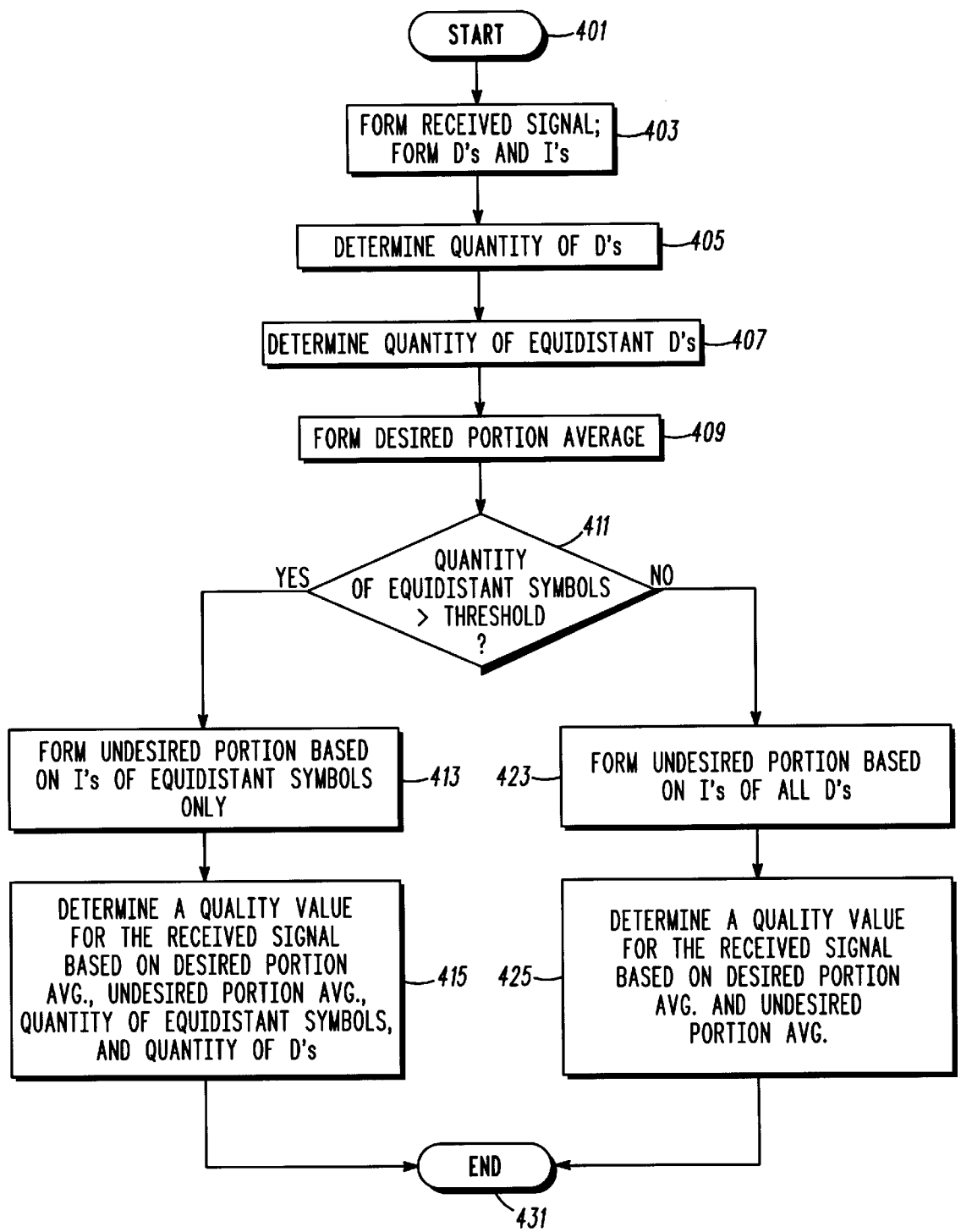
FIG. 2 is a flow diagram for a method for a receiver unit to determine a quality value for a received signal, in accordance with the present invention.

Referring now to FIG. 2, the process starts, step 401, and then goes to step 403.

In step 403, over a predetermined interval, the process forms a received signal thereby forming a plurality of received D's, the plurality of received D's including a plurality of received equidistant symbols; and, for each received D, the process forms a corresponding I.

In step 405, the process counts the plurality of received D's, thus forming a quantity of received D's.

In step 407, the process counts the plurality of received equidistant symbols, thus forming a quantity of received equidistant symbols.

In step 409, the process forms a desired signal portion average based on the received signal 310. This step 409 is similar to the function of the desired signal portion averager element 208 of the Birchler patent. See also Birchler, column 4, lines 56–68, column 5, lines 1–7 and column 6, lines 11–29.

In step 411, the process determines when the quantity of received equidistant symbols exceeds (symbolically, ">") a predetermined threshold value. In an alternate embodiment, step 411 determines when the quantity of received equidistant symbols at least equals (symbolically, "≧") a predetermined threshold value.

If the outcome of the determining step 411 is positive, the process goes to step 413. Here, the process forms a plurality of I's corresponding to the plurality of received equidistant symbols and then forms an undesired signal portion average based on the plurality of I's corresponding to the plurality of received equidistant symbols. This step 413 is similar to the function of the undesired signal portion averager element 207 of the Birchler patent. See also Birchler, column 4, lines 56–68; column 5, lines 1–7; and column 6, lines 11–29. In contrast to Birchler, however, note that the present step 413 forms an undesired signal portion average based only on the I's of the equidistant symbols, whereas Birchler's element 207 forms an undesired signal portion average based on the I's of all received D's, including the received equidistant signals.

After step 413, the process goes to step 415. Here the process determines a quality value for the received signal 310 based on $$\left(\frac{\text{the desired signal portion average}}{\text{the undesired signal portion average}}\right) \text{ multiplied by}$$

$$\left(\frac{\text{the quantity of received equidistant symbols}}{\text{the quantity of received D's}}\right).$$

The process then ends, step 431.

If the outcome of the determining step 411 is negative, the process goes to step 423. Here, the process forms a plurality of I's corresponding to the plurality of received D's, the plurality of received D's including the plurality of received equidistant symbols, and then forms an undesired signal portion average based on the plurality of I's corresponding to the plurality of received D's. Similar to the discussion of step 413 above, this step 423 is similar to the function of the undesired signal portion averager element 207 of the Birchler patent. In contrast to step 413, however, this step 423 forms an undesired signal portion average based on the I's of all received D's, including the received equidistant signals. In this respect, that is, forming an undesired signal portion average based on all received D's, step 423 is identical to the Birchler patent.

After step 423, the process goes to step 425. Here the process determines a quality value for the received signal 310 based on $$\left(\frac{\text{the desired signal portion average}}{\text{the undesired signal portion average}}\right).$$

This step 425 is similar to the function of the signal usability determiner element 209 of the Birchler patent. See also Birchler, column 4, lines 48–55; column 6, lines 4–10; and column 6, lines 25–29.

The process then ends, step 431.

In summary, there has been disclosed a method (FIG. 2) for a receiver unit to determine a quality value for a received signal, the received signal being of a form Dh+I, where D is an information symbol of a constellation of symbols in a complex plane, the complex plane including an origin, the constellation of symbols including a set of equidistant symbols, each equidistant symbol being equidistant from the origin, and where h is a fading signal and I is an interference signal, the method comprising the steps of: first, over a predetermined interval, forming (in step 403) a received signal thereby forming a plurality of received D's, the plurality of received D's including a plurality of received equidistant symbols and, for each received D, forming a corresponding I; second, counting (in step 407) the plurality of received equidistant symbols, thus forming a quantity of received equidistant symbols; third, forming (in step 409) a desired signal portion average based on the received signal; fourth, when the quantity of received equidistant symbols exceeds (in step 411) (">") or, in an alternate embodiment, at least equals ("≧"), a predetermined threshold value, forming (in step 413) a plurality of I's corresponding to the plurality of received equidistant symbols and then forming an undesired signal portion average based on the plurality of I's corresponding to the plurality of received equidistant symbols, otherwise forming (in step 423) a plurality of I's corresponding to the plurality of received D's, the plurality of received D's including the plurality of received equidistant symbols, and then forming an undesired signal portion average based on the plurality of I's corresponding to the plurality of received D's; and fifth, determining (in step 415 or 425) a quality value for the received signal based on a ratio of the desired signal portion average and the undesired signal portion average.

In the preferred embodiment, the constellation of symbols in a complex plane consists of sixteen symbols with coordinates 1+j, −1+j, −1−j, 1−j, 3+j, 3+j3, 1+j3, −1+j3, −3+j3, −3+j, −3−j, −3−j3, −1−j3, 1−j3, 3−j3, 3−j, this constellation being commonly known as a 16 QAM constellation. Also in the preferred embodiment, the set of equidistant symbols consists of eight symbols with coordinates 3+j, 1+j3, −1+j3, −3+j, −3−j, −1−j3, 1−j3, 3−j, this set of equidistant symbols being the Edge Symbols described above.

Notwithstanding that the preferred embodiment uses the familiar 16 QAM constellation, it will be appreciated that the invention is equally applicable to any constellation having symbols that are equidistant from the origin of the complex plane.

In one embodiment, the predetermined interval is approximately 2520 milliseconds and the predetermined threshold value is 700 symbols.

In another embodiment, the predetermined interval is approximately 630 milliseconds and the predetermined threshold value is 28 symbols.

In still another embodiment, assuming that it were predetermined in advance that the quantity of received equidistant symbols were greater than (or at least equal to) the predetermined threshold value, then the process could skip the determining step 411. In this case, the process would advance from step 409 directly to step 413.

In one embodiment, the receiver unit comprises a subscriber unit. In another embodiment, the receiver unit comprises a base station.

In one base station application, for example, a base station uses the invention to determine when to cause a subscriber unit to hand-over to another base station based on the received signal quality from the subscriber unit.

One key advantage of a method for a receiver unit to determine a quality value for a received signal, in accordance with the present invention, is that it increases the maximum received signal quality value that can be determined by the receiver unit. As a result, the receiver unit's ability to distinguish between a non-preferred channel offering mediocre received signal quality and a preferred channel offering substantially greater received signal quality is enhanced. In this regard, a one (1) dB improvement is seen for received signal quality determinations in faded conditions on current and neighboring channels.

Another advantage of the present invention is that it reduces the variance of the received signal quality determination, thus reducing the number of false decisions when the subscriber unit is comparing the received signal quality on the current channel with the received signal quality on another channel. Thus, the subscriber unit is less likely to handover to a new channel when it should not and is also less likely to stay on the same channel when it actually should handover.

A further advantage of the present invention is that it reduces the data dependency of the received signal quality determination so that the determination is not dependent on the data symbols being received. This insures that the receiver unit acts consistently each time it determines the received signal quality. This consistency allows the system designers to accurately test their system to determine how the receiver unit hands over. It also insures that the user obtains the same received signal quality each time, everywhere in the system. This consistency also allows shorter test time when testing the received signal quality determination algorithm since the receiver unit acts the same way each time.

Moreover, the present invention advantageously reduces the processing time and CPU usage for the algorithm since some of the symbols are not processed. This improvement is important since it directly affects the life of the subscriber unit's battery and how often the subscriber user must charge the battery. The present invention is flexible in the sense that if the absolute voltage levels vary significantly and too many data symbols would be thrown away, then the regular algorithm can be used, providing the user with the best received signal quality determination.

Furthermore, the present invention advantageously reduces the processing used to run the algorithm because not all data points are used; it provides complete flexibility so that any data stream sent will have the maximum performance; it provides consistency that reduces system test time and complexity; and, it provides consistency that reduces algorithm test time and complexity.

While various embodiments of a method for a receiver unit to determine a quality value for a received signal, in accordance with the present invention, have been described hereinabove, the scope of the invention is defined by the following claims.

We claim:

1. A method for a receiver unit to determine a quality value for a received signal, the received signal being of a form Dh+I, where D is an information symbol of a constellation of symbols in a complex plane, the complex plane including an origin, the constellation of symbols including a set of equidistant symbols, each equidistant symbol being equidistant from the origin, and where h is a fading signal and I is an interference signal, the method comprising the steps of:

(a) over a predetermined interval, forming a received signal thereby forming a plurality of received D's, the plurality of received D's including a plurality of received equidistant symbols and, for each received D, forming a corresponding I;

(b) counting the plurality of received D's, thus forming a quantity of received D's;

(c) counting the plurality of received equidistant symbols, thus forming a quantity of received equidistant symbols; and (d) forming a desired signal portion average based on the received signal.

2. The method of claim 1, including the steps of:

(e) determining when the quantity of received equidistant symbols exceeds a predetermined threshold value;

(f) forming a plurality of I's corresponding to the plurality of received equidistant symbols and then forming an undesired signal portion average based on the plurality of I's corresponding to the plurality of received equidistant symbols; and (g) determining a quality value for the received signal based on $$\left(\frac{\text{the desired signal portion average}}{\text{the undesired signal portion average}}\right) \text{ multiplied by}$$

-continued $$\left(\frac{\text{the quantity of received equidistant symbols}}{\text{the quantity of received D's}}\right).$$

3. The method of claim 2, where the constellation of symbols in a complex plane consists of sixteen symbols with coordinates 1+j, −1+j, −1−j, 1−j, 3+j, 3+j3, 1+j3, −1+j3, −3+j3, −3+j, −3−j, −3−j3, −1−j3, 1−j3, 3−j3, 3−j.

4. The method of claim 3, where the set of equidistant symbols consists of eight symbols with coordinates 3+j, 1+j3, −1+j3, −3+j, −3−j, −1−j3, 1−j3, 3−j.

5. The method of claim 4, where the predetermined interval is approximately 2520 milliseconds, the predetermined threshold value is 700 symbols and the received signal is a radio frequency signal.

6. The method of claim 1, including the steps of:

(e) determining when the quantity of received equidistant symbols at least equals a predetermined threshold value;

(f) forming a plurality of I's corresponding to the plurality of received equidistant symbols and then forming an undesired signal portion average based on the plurality of I's corresponding to the plurality of received equidistant symbols; and (g) determining a quality value for the received signal based on $$\left(\frac{\text{the desired signal portion average}}{\text{the undesired signal portion average}}\right) \text{ multiplied by}$$

$$\left(\frac{\text{the quantity of received equidistant symbols}}{\text{the quantity of received D's}}\right).$$

7. The method of claim 6, where the constellation of symbols in a complex plane consists of sixteen symbols with coordinates 1+j, −1+j, −1−j, 1−j, 3+j, 3+j3, 1+j3, −1+j3, −3+j3, −3+j, −3−j, −3−j3, −1−j3, 1−j3, 3−j3, 3−j.

8. The method of claim 7, where the set of equidistant symbols consists of eight symbols with coordinates 3+j, 1+j3, −1+j3, −3+j, −3−j, −1−j3, 1−j3, 3−j.

9. The method of claim 8, where the predetermined interval is approximately 2520 milliseconds, the predetermined threshold value is 700 symbols and the received signal is a radio frequency signal.

10. The method of claim 1, including the steps of:

(e) forming a plurality of I's corresponding to the plurality of received D's, the plurality of received D's including the plurality of received equidistant symbols, and then forming an undesired signal portion average based on the plurality of I's corresponding to the plurality of received D's; and (f) determining a quality value for the received signal based on $$\left(\frac{\text{the desired signal portion average}}{\text{the undesired signal portion average}}\right).$$

11. The method of claim 10, where the constellation of symbols in a complex plane consists of sixteen symbols with coordinates 1+j, −1+j, −1−j, 1−j, 3+j, 3+j3, 1+j3, −1+j3, −3+j3, −3+j, −3−j, −3−j3, −1−j3, 1−j3, 3−j3, 3−j.

12. The method of claim 11, where the set of equidistant symbols consists of eight symbols with coordinates 3+j, 1+j3, −1+j3, −3+j, −3−j, −1−j3, 1−j3, 3−j.

13. A method for a receiver unit to determine a quality value for a received signal, the received signal being of a form Dh+I, where D is an information symbol of a constellation of symbols in a complex plane, the complex plane including an origin, the constellation of symbols including a set of equidistant symbols, each equidistant symbol being equidistant from the origin, and where h is a fading signal and I is an interference signal, the method comprising the steps of:

(a) over a predetermined interval, forming a received signal thereby forming a plurality of received D's, the plurality of received D's including a plurality of received equidistant symbols and, for each received D, forming a corresponding I;

(b) counting the plurality of received equidistant symbols, thus forming a quantity of received equidistant symbols;

(c) forming a desired signal portion average based on the received signal;

(d) when the quantity of received equidistant symbols exceeds a predetermined threshold value, forming a plurality of I's corresponding to the plurality of received equidistant symbols and then forming an undesired signal portion average based on the plurality of I's corresponding to the plurality of received equidistant symbols, otherwise forming a plurality of I's corresponding to the plurality of received D's, the plurality of received D's including the plurality of received equidistant symbols, and then forming an undesired signal portion average based on the plurality of I's corresponding to the plurality of received D's; and (e) determining a quality value for the received signal based on a ratio of the desired signal portion average and the undesired signal portion average.

14. The method of claim 13, where the constellation of symbols in a complex plane consists of sixteen symbols with coordinates 1+j, −1+j, −1−j, 1−j, 3+j, 3+j3, 1+j3, −1+j3, −3+j3, −3+j, −3−j, −3−j3, −1−j3, 1−j3, 3−j3, 3−j.

15. The method of claim 14, where the set of equidistant symbols consists of eight symbols with coordinates 3+j, 1+j3, −1+j3, −3+j, −3−j, −1−j3, 1−j3, 3−j.

16. The method of claim 15, where the predetermined interval is approximately 2520 milliseconds, the predetermined threshold value is 700 symbols and the received signal is a radio frequency signal.

17. The method of claim 15, where the receiver unit comprises a subscriber unit.

18. The method of claim 15, where the receiver unit comprises a base station.

19. A method for a receiver unit to determine a quality value for a received signal, the received signal being of a form Dh+I, where D is an information symbol of a constellation of symbols in a complex plane, the complex plane including an origin, the constellation of symbols including a set of equidistant symbols, each equidistant symbol being equidistant from the origin, and where h is a fading signal and I is an interference signal, the method comprising the steps of:

(a) over a predetermined interval, forming a received signal thereby forming a plurality of received D's, the plurality of received D's including a plurality of received equidistant symbols and, for each received D, forming a corresponding I;

(b) counting the plurality of received equidistant symbols, thus forming a quantity of received equidistant symbols;

(c) forming a desired signal portion average based on the received signal;

(d) when the quantity of received equidistant symbols at least equals a predetermined threshold value, forming a plurality of I's corresponding to the plurality of received equidistant symbols and then forming an undesired signal portion average based on the plurality of I's corresponding to the plurality of received equidistant symbols, otherwise forming a plurality of I's corresponding to the plurality of received D's, the plurality of received D's including the plurality of received equidistant symbols, and then forming an undesired signal portion average based on the plurality of I's corresponding to the plurality of received D's; and (e) determining a quality value for the received signal based on a ratio of the desired signal portion average and the undesired signal portion average.

20. The method of claim 19, where the constellation of symbols in a complex plane consists of sixteen symbols with coordinates 1+j, −1+j, −1−j, 1−j, 3+j, 3+j3, 1+j3, −1+j3, −3+j3, −3+j, −3−j, −3−j3, −1−j3, 1−j3, 3−j3, 3−j.

21. The method of claim 20, where the set of equidistant symbols consists of eight symbols with coordinates 3+j, 1+j3, −1+j3, −3+j, −3−j, −1−j3, 1−j3, 3−j.

22. The method of claim 21, where the predetermined interval is approximately 2520 milliseconds, the predetermined threshold value is 700 symbols and the received signal is a radio frequency signal.

23. The method of claim 21, where the receiver unit comprises a subscriber unit.

24. The method of claim 21, where the receiver unit comprises a base station.

* * * * *